(12) United States Patent
Rubin

(10) Patent No.: US 9,299,025 B1
(45) Date of Patent: Mar. 29, 2016

(54) CASE-BASED REASONING SYSTEM USING CASE GENERALIZATION METHOD

(71) Applicant: The United States of America as represented by the Secretary of the Navy, Washington, DC (US)

(72) Inventor: Stuart H. Rubin, San Diego, CA (US)

(73) Assignee: THE UNITED STATES OF AMERICA AS REPRESENTED BY THE SECRETARY OF THE NAVY, Washington, DC (US)

( * ) Notice: Subject to any disclaimer, the term of this patent is extended or adjusted under 35 U.S.C. 154(b) by 518 days.

(21) Appl. No.: 13/734,669

(22) Filed: Jan. 4, 2013

Related U.S. Application Data

(63) Continuation-in-part of application No. 12/755,268, filed on Apr. 6, 2010, now Pat. No. 8,447,720.

(51) Int. Cl.
  *G06F 17/00* (2006.01)
  *G06N 5/02* (2006.01)

(52) U.S. Cl.
  CPC .......................................... *G06N 5/02* (2013.01)

(58) Field of Classification Search
  None
  See application file for complete search history.

(56) References Cited

U.S. PATENT DOCUMENTS

| | | | | |
|---|---|---|---|---|
| 5,715,468 A * | 2/1998 | Budzinski | ............... | G06F 17/27 704/9 |
| 6,138,087 A * | 10/2000 | Budzinski | ............... | G06F 17/27 704/9 |
| 6,609,091 B1 * | 8/2003 | Budzinski | ............... | G06F 17/27 704/9 |
| 7,047,226 B2 * | 5/2006 | Rubin | .................... | G06N 5/025 706/46 |
| 7,349,840 B2 * | 3/2008 | Budzinski | ............... | G06F 17/27 704/9 |
| 7,711,672 B2 * | 5/2010 | Au | ........................ | G06F 17/27 704/9 |
| 7,873,509 B1 * | 1/2011 | Budzinski | ............... | G06F 17/27 704/9 |
| 8,073,804 B1 | 12/2011 | Rubin | | |
| 8,117,147 B1 | 2/2012 | Rubin | | |
| 8,155,949 B1 * | 4/2012 | Rubin | ............... | G06F 17/30401 704/9 |
| 8,250,022 B1 | 8/2012 | Rubin | | |
| 8,280,831 B1 | 10/2012 | Rubin | | |

(Continued)

OTHER PUBLICATIONS

Rubin et al., "KASER: A Qualitatively Fuzzy Object-Oriented Inference Engine," Proceedings, NAFIPS, 2002 Annual Meeting of the North American, pp. 354-359, 2002.*
Rubin, Stuart H., "On Randomization and Discovery", Journal of Informational Sciences, voi. 177, issue 1, pp. 170-191, Jan. 2007.
Rubin, Stuart H., "Computing With Words", IEEE Transactions on Systems, Man, and Cybernetics—Part B: Cybernetics, vol. 29, No. 4, pp. 518-524, Aug. 1999.

(Continued)

*Primary Examiner* — Kakali Chaki
*Assistant Examiner* — Fuming Wu
(74) *Attorney, Agent, or Firm* — SPAWAR Systems Center Pacific; Kyle Eppele; Ryan J. Friedl

(57) ABSTRACT

A method includes comparing a user-specified context having natural language contextual antecedents to cases stored in a case base. Each stored case includes case antecedents and case consequents. A matching case exists and is selected if the case antecedents exactly match the contextual antecedents. If no match exists, a best-matching case is determined and selected. The best-matching case may be determined by generalizing the situational part of a rule and comparing the user-specified context to the stored (generalized) cases. The best-matching case is the case having the highest ratio of matching generalized case antecedents to contextual antecedents and having a matching error ratio that does not exceed an error ratio threshold. The case consequents of the selected matching case or best matching case are then displayed to a user, with case base adjustment performed based upon feedback provided by the user in response to the displayed case consequents.

16 Claims, 5 Drawing Sheets

(56) References Cited

U.S. PATENT DOCUMENTS

| | | | | |
|---|---|---|---|---|
| 8,326,603 | B1* | 12/2012 | Budzinski | G06F 17/27 704/9 |
| 8,447,720 | B1* | 5/2013 | Rubin | G06N 5/025 706/46 |
| 8,688,436 | B1* | 4/2014 | Budzinski | G06F 17/27 704/9 |
| 2004/0107088 | A1* | 6/2004 | Budzinski | G06F 17/27 704/10 |
| 2009/0144075 | A1* | 6/2009 | Flinn | G06N 5/048 705/318 |
| 2014/0279718 | A1* | 9/2014 | Southey | G06N 5/04 706/11 |

OTHER PUBLICATIONS

Rubin, S.H., Murthy, S.N.J., Smith, N.H., and Trajkovic, L., "KASER: Knowledge Amplification by Structured Expert Randomization," IEEE Transactions on Systems, Man, and Cybernetics—Part B: Cybernetics, vol. 34, No. 6, pp. 2317-2329, Dec. 2004.

Chaitin, G.J., "Randomness and Mathematical Proof," Sci. Amer., vol. 232, No. 5, pp. 47-52, 1975.

Rubin, Stuart H., Chen, S., and Shyu, M., "Field Effect Natural Language Semantic Mapping", IEEE International Conference on Systems, Man, and Cybernetics, vol. 3, pp. 2483-2487, Oct. 5-8, 2003.

* cited by examiner

CASE-BASED REASONING SYSTEM USING CASE GENERALIZATION METHOD

CROSS-REFERENCES TO RELATED APPLICATIONS

This application is a continuation-in-part of commonly-assigned U.S. patent application Ser. No. 12/755,268 filed Apr. 6, 2010, entitled "Adaptive Case-Based Reasoning System for Using Dynamic Method for Knowledge Acquisition", the content of which is fully incorporated by reference herein.

FEDERALLY SPONSORED RESEARCH AND DEVELOPMENT

The Case-Based Reasoning System Using Case Generalization Method is assigned to the United States Government and is available for licensing for commercial purposes. Licensing and technical inquiries may be directed to the Office of Research and Technical Applications, Space and Naval Warfare Systems Center, Pacific, Code 2112, San Diego, Calif., 92152; voice (619) 553-2778; email ssc_pac_T2@navy.mil. Reference Navy Case No. 101366.

BACKGROUND

The embodiments of the subject matter discussed herein relate to case-based reasoning systems and methods that perform situational generalization and update.

DETAILED DESCRIPTION OF SOME EMBODIMENTS

Figure 1:
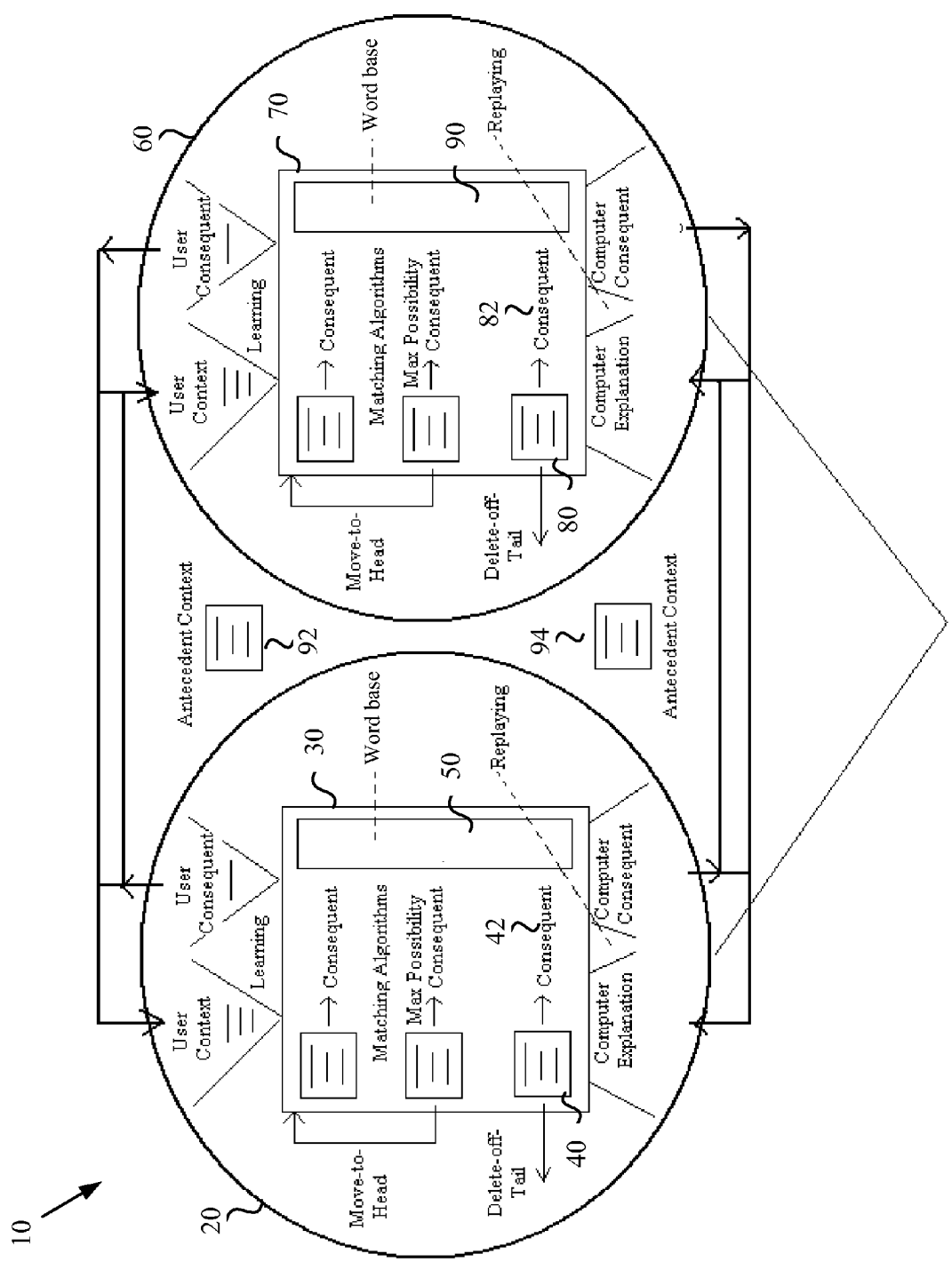
FIG. 1 shows a block diagram of the operation of one embodiment of a system in accordance with the Case-Based Reasoning System Using Case Generalization Method.

Decision-support systems use a case-based reasoning (CBR) paradigm, rather than a rule-based one because the acquisition of cases does not require the services of a knowledge engineer and because case-based systems easily scale to almost any multiple of the size of expert systems. However, cases are not readily adaptable and unrelated methods for their generalization have not been successful to date. The subject matter disclosed herein details a novel heuristic algorithm for situational generalization and update. It also keeps track of the possibility of error in all of its recommendations, which may incorporate multimedia—depending on the implementation. The system autonomously evolves general (and analogous) rules from cases and they will replace the source cases as the rules become verified over time. This capability for generalization and storage reclamation means that the utility of the system increases with use—not only by way of manual training, but through independent autonomous generalization, as well. Furthermore, cases are not parametized. Rather, the synthesis of novel creative actions for predicting course of actions (COAs) is supported by minimizing the granularity of the cases.

A distinct algorithm for context-free grammatical inference makes the system far easier to train, use, and/or update. Basically, a recursive extrapolation shows the user autonomously acquired (hierarchical) definitions for reuse (i.e., if not cached) and the situations or actions are entered using natural language. The allowance for non deterministic situations enables the user to splice-in creative alternative actions for use in training the system. The number of presented alternatives may be limited by the user by checking one or more appropriate subject headers (acquired during training) In this manner, the system also learns to equate distinct syntactic specifications with a common semantics—further reducing the difficulty of using and maintaining it. An example of the method, applied in the context of predicting proper COAs—including CBG-directed mining, serves to illustrate the operation and attendant strong advantages case-based generalization (CBG) provides over CBR.

The purpose for providing courses of action (COAs) is to study, develop, and demonstrate methods for the directed mining of vast quantities of information, gathering new contextual information, and making predictions. This will provide a coordinated systems approach to the mining and prediction of appropriate behaviors during tense times, to include all types of critical infrastructure, key resources (both civilian and military), and high traffic areas (transit/transportation facilities) following any type of incident (e.g., movement of resources under surveillance). Working with interagency partners, including federal/state/local/tribal governments, military, private industry, and non-profit organizations, the prediction of COAs intends to develop solutions to reduce the time and resources required to analyze military installations and other critical infrastructures following an incident. Included in these solutions are structured and unstructured data at all levels of government. The goal is to develop predictive solutions for the observed countries for all relevant scenarios.

A major problem, which arises in the application of case-based reasoning to disaster recovery operations, is the adaptation of cases to analogous situations. In most ways, this is similar to the prediction of COAs. Such adaptation need not only occur for the left-hand, or situational side (LHS) of the case, but is often needed for the right-hand, or action side (RHS) as well. As an example of both in the context of disaster recovery operations, suppose one has the case:

Agent YELLOW dispersed on stadium &
Winds shifting to the North &
Rush exit on the North side estimated to take 9 minutes & panic likely
→
Use stadium PA,
Announce to cover skin and eyes,
Announce to breathe through clothes,
Announce not to panic and exit through the nearest exit. (1)

Now suppose that winds are shifting to the South and a rush exit on the South side is estimated to take 15 minutes and panic is likely. Ideally, one will be able to properly adapt case (1) for this new assertion, assuming that it is the closest match by some metric(s). The adapted LHS becomes:

Agent YELLOW dispersed on stadium &
Winds shifting to the South &
Rush exit on the South side estimated to take 15 minutes & panic likely (2)

Here, no adaptation of the RHS appears to be necessary. Next, let us change the basic nature of the threat to a dispersal of Strontium-137 instead of agent YELLOW. The adapted LHS of (2) now becomes:

Strontium-137 dispersed on stadium & agent radioactive & Winds shifting to the South &
Rush exit on the South side estimated to take 15 minutes & panic likely (3)

One will need to adapt the RHS of (1) at this point. The adaptation must be conditioned to the new threat and the context of not only its occurrence, but also the ill effects associated with exposure to it. Here, the properly adapted case might appear as follows.

Strontium-137 dispersed on stadium & agent radioactive & Winds shifting to the South &
Rush exit on the South side estimated to take 15 minutes & panic likely
→
Use stadium PA,
Announce to hold a non permeable coat or shirt over ones head,
Announce to huddle together in a tight mass,
Announce not to panic and exit through the nearest exit. (4)

The idea of this adaptation is to minimize the ingestion of radioactive contamination without inducing panic, which likely would result in unnecessary deaths. Clearly, an alternate resolution to the adaptation problem is to eliminate the need for adaptation by way of inclusion of enough cases so as to minimize the need for it. One problem with doing this is that even if achievable using a limited semantic representation, it is not practical to achieve using syntactically distinct, but semantically equivalent phrases (in combination). Moreover, semantic phrases can change their meanings in different contexts. When human first responders meet such challenges, they do so using metaphor and analogy. This then is the geodesic for the fuzzification of qualitative knowledge.

Next, we proceed to develop a system and method for the evolution and use of case-based generalization (CBG). Finally, an example will be given in the context of predicting COAs. This example, and the reality of making such predictions, is operationally complicated by the interaction among multiple incoming data streams.

Case-Based Generalization

CBG is like CBR in that both methods embody operational case-based knowledge. However, CBG seeks to generalize that knowledge and in so doing increase the scope of its applicability. Thus, it can be stated that CBG embodies a capability to mine knowledge from knowledge. CBG employs heuristic search as a precursor to generalization and the reuse of more or less finely-granulated actions as its basis for computational creativity. It is clear that the basis for computational creativity is heuristic search when coupled with a dynamic episodic memory. Unlike a transformationally-based approach, a "workable balance" is an emergent property of such a heuristic-based approach; whereas, it is arbitrarily defined otherwise. Table 1 below presents five arbitrary cases, four situational variables, and four associated actions. It will serve to help us to explain some fundamental operations in CBG. Note that ND implies that the associated action is non deterministic as is true of case situation #1 (i.e. actions $A_1$ and $A_4$). Just as one situation may have multiple associated actions, multiple situations may share the same associated action as is true of case situation #2 and case situation #5 (i.e., action $A_2$).

TABLE 1

| Case\Situation | a | b | c | d | → | $A_i$ | ND |
|---|---|---|---|---|---|---|---|
| 1 | — | — | X | — | → | $A_1$ | $A_4$ |
| 2 | X | — | X | — | → | $A_2$ | — |
| 3 | — | X | — | X | → | $A_3$ | — |
| 4 | X | X | — | X | → | $A_4$ | — |
| 5 | X | X | — | — | → | $A_2$ | — |

If the context $\supseteq S_i$, then a proper most-specific covering exists in the case base. In this situation, a traditional inference engine may fire the most-specific case, where |context–$S_i$| is minimized (i.e., minimize |context–$S_i$|/|context|, where the ratio will be in the range [0, 1)). Otherwise, the context $\subset S_i$, or incomparable, which means that some "best" case will need to be generalized to obtain a fuzzy match, if possible, where |$S_i$–context| is minimized (i.e., minimize |$S_i$–context|/|$S_i$|, where the ratio will be in the range (0, 1]). A message to the effect that the context cannot be matched is returned just in case the likelihood of error is too great (i.e., where either of the previously defined error ratios is within some defined percentage threshold of unity or squelch, which results in a ratio that is >>zero). A metaphorical explanation may be given.

Quantitative and/or qualitative matches may be fuzzy, where a Boolean result is always returned to facilitate concept definition. For example, 50 percent cloudy might define "Partly Cloudy", where the fuzzy match is encapsulated by at least one conceptual entity. Also, the functional localization of fuzzy processing facilitates truth maintenance and massively parallel processing. Suppose, for the sake of argument, that the context is {b}. Every case situation in Table 1 is summarily ruled out from being covered by this context—either because it does not incorporate {b} in its situation, and/or because it incorporates at least one other situational variable, which of course is not covered.

Case #4 is ruled out because only ⅓d of its situational variables are covered (cases #3 and #5 have ½ of their situational variables covered). Case #3 includes the situational variable d and only one other case (i.e., case #4) includes this situational variable. We see that the actions associated with case #3 and case #4 are $A_3$ and $A_4$, respectively. Case #5 includes the situational variable a and two other cases (i.e., case #2 and case #4) include this situational variable. We see that the distinct actions associated with these three cases are $A_2$ and $A_4$. By minimizing the number of distinct associated actions, the chance of error is proportionately reduced. However, here there is a tie at two associated actions. Thus, the next level heuristic is to select the most-recently used (MRU), or acquired case, which without loss of generality is say case #3.

When the correct associated action is known, say {b}→($A_3$), it is logically acquired at the head of the case base. If subsequent evidence shows that to be incorrect, it will be expunged/replaced. Otherwise, this move-to-the-head operation will logically maintain the fired case above case #3, which has a situation that is a superset of the newly generalized case. At this point, the generalized case will always fire in preference to case #3, which falls to the logical bottom—becoming a member of the LRU cases. Its memory space will eventually be reclaimed as necessary (or it will be moved to slower secondary storage), but only if the generalized case is never once found to be in error.

Also, if the generalized case were instead say {b, c}→($A_3$), so that the situation for case #3 is no longer a superset of it, then case #3 will co-exist with the new case and will not necessarily become a member of the LRU cases until a generalization of one of them yields say, {b}→(A₃). Of course, the greater multiplicity of cases now having this as a possible generalization serves to increase the relative chance of such a generalization being found because it results in a proportionate increase in the number of contexts being ideally matched. Generalizations, which introduce extraneous situational variables are said to be analogies (i.e., equivalent under transformation). Clearly, CBG supports analogy formation.

Below is a heuristic algorithm for finding the best match for the presented context, where the context $\supseteq S_i$, or the context $\subset S_i$. This choice will favor an overall minimal error ratio, which is outside of the dynamically set squelch. The steps taken by this algorithm are inherently heuristic. The validity of these steps is thus judged by their efficacy, in conjunction with case acquisition, to minimize the number of subsequent errors obtained. The order of steps is meant to maximize the efficiency of the algorithm by pruning those cases least likely to be an ideal match for firing a priori. Should this result in a best/proper match being lost, the idea is that a more-specific case will be obtained anew by way of case acquisition and it will also serve as a new point for generalization. One embodiment of the algorithm is as follows:

1. Dynamically set the error ratio squelch to some defined percentage threshold of unity such that it is >>zero (e.g., 50%). The greater the squelch percentage, the less the tolerance for error.
2. If the context $\supseteq S_i$, then this case comprises a proper most-specific covering. In this situation, the |context−$S_i$| is minimized (i.e., minimize |context−$S_i$|/|context|, where the ratio will be in the range [0, 1)).
3. If the context $\subset S_i$, or incomparable, then this situation (case antecedent(s)) needs to be generalized to obtain a proper covering. In other words, the situation embodies too many constraints—at least one of which cannot be covered by the context. The process of generalization removes unnecessary constraints to increase the likelihood that the situation will fire and trigger an appropriate action. Of course, we don't want to make the situation too general, or it will fire when it is not proper to do so. Here, the |$S_i$−context| is minimized (i.e., minimize |$S_i$−context|/|$S_i$|, where the ratio will be in the range (0, 1]). For example, the context, {cloudy} is not specific enough to cover the situation, {cloudy, freezing}. This situation might be paired with the action, (precipitation). However, we can generalize this situation to {cloudy} to be matched by the same context. Notice that the associated action here is proper. However, if the associated action were say, (snowing), then generalizing the associated situation to {cloudy} would result in an overgeneralization because this same situation could non deterministically imply, (raining) It's not that we need to enjoin non-deterministic rules. Rather, we can deterministically distinguish between predicting rain or snow; but, only if we take care not to over-generalize.
4. If the best found error ratio is squelched, then a message to the effect that the context cannot be matched is returned. Otherwise, the best found matching case (i.e., the one having a minimal error ratio, which preferably is a subset of the context, is closest to the head of its segment list, and which in turn is closest to the head of its list of segments and levels, in the event of a tie(s)) is returned along with an indication as to whether or not generalization was required to make the match.
5. An optional metaphorical explanation, showing the derivation, if any, is produced.
6. If the produced action is deemed to be incorrect, then a correct action is obtained from the user, the situation is queued (FIFO) for future acquisition, or the fired case is expunged from the system.
7. Exact situational matches are allowed non deterministic actions, but have incorrect associated actions overwritten and moved to the head of their resident segment. Otherwise, the context is taken as the situation to be paired with the specified action. This is proper for future coverings and generalizations. New cases are acquired by the best-matching segment(s)/processor(s) (see below).
8. Equations (5) and (6) below provide possibility metrics, which may or may not be 'aged'.
9. Reclaim memory and processors on an as-needed least-recently used (LRU) first basis.

The generation of creative actions is enabled by making each case as fine-grained (i.e., domain-specific) as is practical, where actions conclude by pasting non monotonic trigger variables (i.e., set definitions and/or mnemonics retrieved from situation or action definition tables) to a global blackboard. This process effectively enables the synthesis of new actions by way of variation in the sequence of case firings. The trigger variables may define useful conceptual conclusions. For example, when changing a light bulb, the following trigger variables are a natural—that is, "switch is off", "bad bulb removed", and "new bulb inserted". Notice that here the creativity can occur by changing the process for removing say a bad incandescent bulb to that for removing say a bad fluorescent bulb, where the resulting process is said to be analogical in the colloquial sense.

The trigger variables serve to minimally encapsulate that which needs to be updated—thereby maximizing the reusability of said object. The knowledge of how to make new knowledge is embedded in the granularity and reuse of these objects. These action sequences cannot be effectively transformed in general without incurring error because any change to the situational context can have unique domain-specific consequences.

Furthermore, cases are not parametized. Rather, the synthesis of novel creative actions for predicting COAs is supported by minimizing the granularity of the cases (thus maximizing their reuse). Generalized situations and (associated) creative actions may then be synthesized by definitional substitution—including definitional elimination [6]. Such transformation is supported by an allowance for non deterministic situations and many to one situation to action mappings. In the same manner as Broca's area allows for the production of fluent speech in humans, CBG can be designed as a System of Systems or Society of Mind; whereby, each constituent system learns to "smooth" (transform) the action sequence produced by another—including itself. Critical sequences can be captured by situations, which are designed to be sensitive to order (e.g., "the man bit the dog" vs. "the dog bit the man"). The advantage of doing this is that creative semantic constructs can be separated from syntactic constructs so as to retain the benefits of each for an improved overall system capability for the synthesis of novel knowledge. Any produced action may be specified so as to update the context as a prelude to the next iteration of the inference engine.

A context may simultaneously fire situations at different levels, which produce simultaneous actions that may be independently fused at multiple levels. These levels, at which sequential firings may occur, can move up and down the hierarchy of levels, which gives rise to a heterarchy. This process will converge in relatively few iterations (e.g., five or six based on related simulations of the brain) if cycles are tested for and removed in all learning situations. Cycles may be detected through state repetition. Again, separation of transformations into interacting fine-grained reusable cases and their generalizations makes for a much stronger system over time. Indeed, it is believed that this design best emulates the creative capabilities of the human mind.

CBG is inherently scalable. This implies operation over thousands or even millions of parallel processors, where each processor addresses a domain-specific segment and holds part of the collective storage. In order to accomplish this goal, new cases must be acquired by the proper segment(s) or assigned to idle/LRU processors to comprise new segments, and as a consequence, the LRU'd processors must be freed for reuse when needed.

Whenever a new case is to be acquired, its situational part is compared against each case in each segment in parallel. The number of situational variables, which each case in the segment has in common with the candidate new case is summed for each segment. These sums are then divided by the number of resident cases in the segment (or one if otherwise zero) to yield an average measure of commonality (AMC) for the segment. The segment(s) having the greatest such average are then said to be most-closely aligned with the new case, which is then acquired at the head of these segments. If two or more segments have the same average, then the new case is simultaneously acquired by each of them. Segmentation allows for massive parallelism in part because it insures that the LRU'd cases are ascertained in relation to those dealing with the same subject matter.

A new segment is created if ever the maximal sum is zero because then the new case would be disjoint with every segment. However, this is too strict a requirement for creating a new segment as follows. Two or more domains are said to be disjoint if and only if they are mutually random. Furthermore, a series of numbers is said to be random if the smallest algorithm capable of specifying it to a computer has about the same number of bits of information as the series itself. A random series of digits is one whose complexity is approximately equal to its size in bits.

However, it follows from the Recursive Unsolvability of the Equivalence Problem that any algorithm complex enough to be capable of self-reference has a smallest equivalent version of itself, which is recursively enumerable, but not recursive. As a consequence, domains, which are not known to be mutually random, may actually be so. This in turn implies that a new segment is appropriately created even where the maximal sum may be somewhat greater than zero. Again, it follows from computability theory that the cutoff squelch here must be heuristically determined.

Segments can be clustered into levels on the basis (i.e., idea) of having minimal inter-level AMCs and maximal intra-level AMCs. The number of levels is designed to minimize the number of steps required, on average, for hierarchical retrieval, or for broadcast for processing by the appropriate members of the hierarchy. Thus, for example, it follows from information theory that if a processor can store say 10,000 cases, then ideally there will be 10,000 segments (each consisting of up to 10,000 cases), 10,000 levels (each consisting of up to 10,000 segments), 10,000 meta-levels (each consisting of up to 10,000 levels), and so on until the appropriate hardware resource is hierarchically defined. New cases are acquired at the (meta-) level having the maximal AMC, where tie scores allow for simultaneous acquisition by more than one (meta-) level. This hierarchical structure is not inconsistent with the dynamic acquisition of additional processor hardware in an open architecture. In practice, the maximal size of any single hierarchy is limited by the requisite response time needed to process the number of inputs to be assigned to the proper (meta-) level(s) and/or segment(s) during that time. System throughput can also be maximized through the use of direct memory access (DMA) and redundant systems.

A minimal AMC is maintained at each (meta-) level for new cases acquired by existing (level) segments (having the maximal AMC). The AMC is initialized to zero. A new segment is created and assigned a (freed LRU'd) processor and the new case is acquired there. Each processor will acquire one case before any processor acquires a second one. However, at that time a non zero minimal AMC is defined. The LRU'd processor is freed and is assigned a new case whenever the AMC for the new case is less than or equal to the minimal AMC. If its AMC is less than the minimal AMC, then the minimal AMC is set to this lesser value. Otherwise, the new case is acquired at the logical head of the segment(s) having the maximal AMC. If space is insufficient for the case acquisition, then a new segment will be created (freeing a LRU'd processor) and the new case is acquired there.

The LRU'd processor is again the one whose storage is reclaimed and is most-readily identified by keeping the identity of each processor in a logically-linked list. The concept here is to save the most valuable knowledge and lose only the least valuable knowledge, relatively speaking, on an as necessary basis. Newly assigned segments move a processor to the head of this list as does the proper or improper firing of one of a segments cases. The LRU'd processor is then defined to be the processor at the tail of this list. Similarly, if new processor hardware is acquired, it defines the perennial tail of this list. Whenever a segment is moved to the head of its list of segments, its containing level is moved to the head of its list of levels, and so on.

Every generalization has an inherent chance of error. The allowance for error varies with the application domain, but in all cases it is useful to provide a measure of this latent error. This measure is termed a possibility, rather than a probability, because this chance for error is domain dependent and need not follow any formal laws of probability. The possibility of error, where the context $\supseteq S_i$, is given by $$p = \frac{|\text{context} - S_i|}{|\text{context}|} + \delta \qquad (5)$$

The possibility of error, where the context $\subset S_i$, or incomparable, is given by $$p = \frac{|S_i - \text{context}|}{|S_i|} - \delta \qquad (6)$$

where, $0 < \delta < 1$.

The greater the number and diversity of successful application tests of the generalization, the greater the possibility and vice versa. It is suggested that generalizations be 'aged' and that the longer one exists (i.e., the greater the cumulative count of successful firings), the less the possibility of error, where the final possibilities of validity are in the range (0%, 100%). These possibilities are based on the actual number of (domain-specific) generalizations that are subsequently found to be in error as a function of their age (i.e., based on usage and metrics for diversity of usage, where greater use and a greater diversity of domains for use are better). The greater the possibility of error (i.e., using equation (5) and equation (6)) and the aged possibility is taken to be the true possibility (i.e., since true aging would require an infinite period for observation). Aging is a domain-specific construct, which heavily depends upon the characterization of the problem within the aforementioned parameters.

Grammatical Inference

Grammatical inference defines attempts by the system to auto-extrapolate situations or actions as the user types (or signs or even vocalizes) them. Thus, it is a form of associative memory (AM)—one which can iteratively improve. Besides facilitating ease of entry and replay, accepted extrapolations insure that the system already at least knows the concept and thus serves to minimize the number of alternate syntactic forms, which must be acquired for semantic comprehension. This in turn means that learning by the system can be easier and faster. Moreover, situations and actions may be hierarchically defined through the use of distinct tables—one for situations and one for actions in each local processor. Situations are always sets (where order is insignificant) and actions are always sequences (where order is critical). Thus, the realization of auto-extrapolation will differ for each.

Just as in a non deterministic case one situation can be associated with numerous alternate actions there are often numerous alternate extrapolations of situations or actions. These alternates are symmetric because they share common subsets (i.e., for situations) or subsequences (i.e., for actions). The number of such alternatives is presented to the user so that they may know if a greater level of specification is to be attempted prior to searching for proper auto-extrapolations. If no auto-extrapolation is offered, then the current set or subsequence is said to be random relative to the existing base of the same. In this case, the user manually completes the specification and the result is made available for all subsequent auto extrapolations.

Each situation or action is reduced to one word, or a single phrase. The reduction may be many to one and this process may be hierarchical, but necessarily acyclic (e.g., one may not define a word or phrase using that word or phrase in a daisy chain). The stipulation applies equally to situational as well as action productions. Cycles are readily detected, at the time of acquiring a new definition, by seeing if the new definition (LHS) is a recursively-defined disjunct in any RHS defining term, which is best described by way of example. Take the following:

$$a \rightarrow b|c$$

$$b \rightarrow a \quad (7)$$

In this example, a and b are involved in a cycle, which may be discovered by pushing onto a stack a, b, and a; or, b, a, and b—depending on the starting production. Alternatively, notice that c may be partially reduced to b without incurring any cycle. Similarly, so-called daisy-chained cycles may be detected through the use of a stack as follows:

$$a \rightarrow b|c$$

$$d \rightarrow a$$

$$c \rightarrow d \quad (8)$$

Here, we push onto a stack c, a, d, c; or, alternatively b, a, d, c, a. In either scenario, cyclic behavior is detected and prevented by expunging the most-recently applied production, which induced the cycle.

Next, consider (7) again. Traditionally, b would not syntactically cover c, but it is clear that $c \subseteq b$. The situation is made more complex by the realization that a multiplicity of sets or sequences may be involved and that they may be non-deterministic as well. Recall that any applied definition, production, segment, or level is moved to the head when applied. Thus, the best strategy is to iteratively apply the definitions in order of MRU'd to LRU'd until no further reduction is possible. This is done to the context, situations, and actions (in parallel). If at least one reduction is so made, then the result is saved. This provides for the dynamic update of cases in the system in response to the acquisition of new definitions or even the change in definitional ordering, which follows their use. In this manner, literal matches of context and situation are better enabled as described in the previous section.

Moreover, it might be argued that varying the order of attempted reductions might allow for a more compact result if a space of such reductions is randomly explored and followed by a systematic orderly reduction from MRU'd to LRU'd as previously described. However, there are several problems with such an approach as follows. First, if the context and the situational part of some case were exactly the same, different orders of reduction might result in literal non-matched results. It is not that this can otherwise be prevented, but rather that optimality in the matching process cannot be practically assured—vying against the need for any near optimal random reduction. Second, random exploration can be an indeterminate time sink, which will slow any system down to an unacceptable level. Finally, cases will be reduced over the life of the system so that the net result, as suggested, will approximate the random result—a result that cannot be had in practice due to the associated temporal constraints. Thus, it follows that the suggested best strategy above is the best strategy. Words or phrases may incorporate objects such as images, videos, and/or sounds. An example of hierarchical situation and action definitions is given in Tables 2 and 3 below.

Note that in the last action definition in Table 2 (or for situational definitions) there is more than one alternative definition. The selection of an alternative causes it to be moved to the logical head (and the logical left) so as to minimize search time in the future, which is based on the principle of temporal locality. For example, one might begin a situational specification with High Voltage and have the system immediately ask if you are referring to Spark Plugs. If answered in the affirmative, the system would ask if you are referring to an Engine, and finally it would ask if you are referring to a Car. If answered in the negative, the user can use the system dictionary of words and phrases (i.e., as well as teach the system novel words and/or phrases) to complete the specification. The dictionary acquires at least phrase knowledge from the user. An example of hierarchical situations is shown in Table 2 below, with an example of hierarchical actions being shown in Table 3.

(CAR Tires Engine (Gas Pedal) Brake (Steering Wheel)|(LISP List Head) . . . )
(ENGINE Pistons Cylinders (Spark Plugs) Gasoline . . . )
(SPARK PLUGS Points Ceramic (High Voltage) . . . )
(FILL'ER UP Drive To A (Gas Station) To (Buy Gasoline))
(BUY GASOLINE (Remove Gas Cap) (Pay For Gas) (Start Pump) (Insert Nozzle Into Car))
(PAY FOR GAS (Use Cash)|(Use Credit Card)|(Use Debit Card))

Similarly, one might begin an action specification with Use Cash (in the context of say, or Use Credit or Debit Card, where the specification of disjunctions may serve to delimit the number of alternative definitions returned) and have the system immediately ask if you are trying to Pay For Gas. If answered in the affirmative, the system would ask if you are trying to Buy Gasoline, and finally it would ask if you are trying to Fill'Er Up. Note again that while the order of specification is insignificant for matching situations, it is critical for matching actions (not disjunctions). Thus, while the partial specification, "Gas Station To Buy Gasoline" is known to suggest the action, "Fill'Er Up", the partial specification, "Buy Gasoline To Gas Station" is an unknown sequence. The embedded sequence need not be a prefix to generate a candidate extrapolation.

The reduction of new situations and actions into the aforementioned hierarchical form provides for ever-greater compression of storage and ease of access. Not all situations or actions need have an associated conceptual definition as is shown in Table 2. Rather, default mnemonics provide for the extrapolation of situations or actions, by serving as an AM. Situational and action definitions may be added to, expanded, or in rare cases, expunged (i.e., after checking to be sure that deletion will not result in a dangling pointer). Their acquisition may result from concurrent learning using a semaphore or monitor mechanism to insure that one update completes before enabling a possible other.

Given a nesting of hierarchical situation or action definitions, it can become somewhat tedious to agree with the system as it automatically traverses to higher and higher levels. This comment applies equally to selecting among a list of alternative hierarchical definitions. In such cases, the method of temporal locality can be applied to usually expedite the process, whereby usage patterns are maintained (updated) in a dynamic cache so that the MRU pattern of definitional selections is the one presented to the user, which defaults to manual selection and learning in the event of failure. The keying context used here is the most-recent successful usage pattern, which may be a subset or subsequence of that cached, as appropriate. Of course, this is a user option, which may be enabled (by default) or disabled as the user sees fit. The user may also select among distinct, possibly hierarchical, definitions as the following generic example of action definitions makes clear.

$$(\text{SAILBOAT Type of Boat Having a Specific Design})$$
$$(\text{LASER Type of Boat Having a Specific Design}) \quad (9)$$

The number of alternative (hierarchical) situations or (hierarchical) actions returned by a search for an associative match can grow to become unwieldy. Fortunately, the number of alternatives can be delimited by several additional means—including a request for only the top n MRU'd matches. Moreover, if definitions are associated with one or more hierarchical subject categories at the time of their acquisition, then ticking the desired category or categories at the time of retrieval can serve to delimit the number of alternative definitions returned. Similarly, one can tick categories not to be included in the search and retrieval process.

Nevertheless, it is thought, at this juncture, that the use of large dynamic caches will eliminate the need for such categorization—particularly in domains where the pattern of usage is more predictable than not. Such domains have the side benefit of being consistent with technologies for intrusion detection as well. Thus, grammatical inference can protect the very system it serves.

Transformation and Non Determinism

Heuristics represent a condensation of the domain-specific knowledge embodied in minimizing the complexity of the search paradigm. This knowledge must, by definition, include heuristics in the general case. This inclusion is necessary for a mathematical fixed point to arise, which in the case of an indefinite sequence has a random sequence as the image of its randomization. It follows that in the general case there can be no such thing as logics for discovery—only heuristic search, including heuristics for discovering heuristics, ad infinitum, until a domain-specific fixed point is reached.

As supporting evidence, we next prove that heuristic acquisition is inherent to any non-trivial randomization of knowledge. Let, $f$ be a total computable search function, which maps an arbitrary context, c, to an arbitrary case antecedent, a, where c and a are state vectors. Maps, unlike equality (=), are designated by implication signs (→). Then, $$f(c) = \begin{cases} a, & \text{if } \|f(c) - a\| < \delta; \\ NIL, & \text{otherwise.} \end{cases}$$

where the indicated norm defines a qualitatively fuzzy match. Next, let g(a)→b and $f$(c)→h(b), where b is an arbitrary state vector; g and h are total computable functions; and, $g^{-1}$ may not substitute for h, where it exists, because 0<δ. Note that the use of the function h in h(b) denotes the case adaptation problem, which is as yet unsolved in the literature for the general case. We may write, $f$(c)→h(g(a)), and since g and h are total computable functions, it follows that $$a \to \begin{cases} k(a), & \text{if } \|f(c) - a\| < \delta; \\ \bot, & \text{otherwise.} \end{cases}$$

where k is the total computable composition, h·g. Now, where δ is arbitrarily large, we may write, a→k(a), a≠k(a). Next, define F to be a Function of Functions such that F={$f_0$, $f_1$, ... $f_n$}. It should be clear that we can write, F→g(F), where g is a redefined total computable function. Then, through the use of pairing and projection functions, one may equivalently write, $f$→g($f$), $f$≠g($f$). Observe that, a→$f$(a) and a→g($f$(a)), where $f$ is a redefined total computable function. Thus, it follows that there must be inherent non determinism in a general case adaptation, since a is arbitrary and $f$≠g($f$). It also follows that the alternatives, selected at random, are equivalent under transformation (i.e., analogous)—under the image of the arbitrary functional, g.

In some embodiments, different levels, squelching, and non-monotonic reasoning may interact with the context through a global blackboard mechanism. An (iterative) action response is generated from the fused actions. Squelching is realized through inter-processor communication. In terms of the process for assigning cases and their generalizations to the most appropriate segment(s)/processors, all processors are allocated before any are de-allocated.

Intelligence Processing

There are vast quantities of data that have been collected over decades of monitoring. This data consists of various forms of SIGINT, imagery, HUMINT, MASINT, GEOINT, etc. and is logged in digital, analog, and textual forms. Categorically, adversary logistical, political, economic, other military, social, information, or infrastructure (PMESII) activity may be more or less relevant. There are plenty of latent associations among the datum, which have not been discovered. In particular, the context, which properly predicts a significant event, such as a major exercise or operation by adversary forces, cannot be obtained from analysts because of their often limited understanding of the salient indicators. Needed predictive timeframes depend upon command operations and vary from a day to a month in advance.

Moreover, analysts have to guess at the proper timeframe window and this includes knowledge-directed search as well. Clearly, there are advantages to be had from the automation of this process as it is currently practiced. The larger the data set that needs to be integrated, the greater the chance of missing an isolated detail that unlocks the riddle leading to the adversary's intention(s) or planned activity. In view of the aforementioned requirements, we will show, in the next section, how CBG can be applied to predict likely future activities not uncovered by CBR (or expert systems, neural networks, etc.). In particular, the following capabilities will be emphasized:

1. Automated analysis of existing archives of intelligence data leading to the mining of predictive generalizations and/or analogies for adversary activities. Every case, generalization, and analogy will provide a possibilistic analysis to facilitate internal processing as well as to provide Commanders with an estimated likelihood.
2. Incorrect predictions lead to super-linear learning whenever feedback based on outcomes is provided thereof.
3. A cached and otherwise extrapolated natural language interface for data input and query functions
4. A capability for unlimited expansion across (distributed) parallel processor networks for extreme scalability in memory and speed of operations
5. A capability for information fusion by domain, which need not have been explicitly trained for Intelligence Example To begin, this example will be taken from the domain of perception and intelligent decision making. It is not intended to address all aspects of this disclosure and by the same token will not address all aspects of the problem, which follows. This example will automatically process sensor data (intelligence) from sensor data to intermediate conclusions to actionable understanding presented to the warfighter and the system to include multiple warfighters (parsing data) or the entire system (i.e., Data to Decision, or D2D). The system will consist of an inter-connected set of subsystems for a not necessarily complete graph. Communication between subsystems occurs via a global blackboard mechanism. Here, particular sensing gaps are recognized by the CBG subsystem and once recognized, an augmented context is sent to the appropriate subsystem(s).

For example, if an airborne Global Hawk system is using full-spectrum imaging and a physically co-located (but not necessarily logically co-located) sensor (i.e., a sensor, which is perhaps resident in a different logical subsystem) detects fog, then this sensor and logically co-located sensors will process this fact and likely transmit an action to one or more logical subsystems that include the imaging sensor to switch to infrared wavelengths (for greater fog penetration). This subsystem, in turn, will report back any problems in complying with the request (e.g., non availability).

Another task, performed by this disclosure, is that it autonomously and dynamically allocates the logical grouping of resources (i.e., sensors) into common pools on the basis of a segmented domain. Thus, for example, cases, generalizations, and analogs that address say movement over a 1 second timeframe are automatically grouped into one segment (processor), while those that address say change in reflectance over an arbitrary timeframe are grouped into another. Segments are dynamically released and reassigned based on being the LRU'd. This is a necessary operation because data throughput is high enough and otherwise persistent enough to outstrip processor resources. Also, automatically segmenting the domain provides an advantage in that as previously discussed, the LRU'd stores are expunged with respect to their containing segment(s)—not grouped into one list, where domain knowledge would be lost more because it was incomparable with another than because it was LRU'd. Thus, the CBG system autonomously preserves knowledge based on its utility and domain.

Missions are defined by the interaction among subsystems, which results in some output. Cyclic behavior is prevented through the detection of state repetition and deletion of the most recently fired segment/case, which led to the repetition. Another case will likely follow and the process thus iterates. Missions, which state user priorities, are similar to sensors because they condition a context, which in turn conditions the iterative firing of segments. The mission-level sensing task may not have been successfully accomplished if the right logical combinations of sensors are not associated with the right actions. For example, the detection of a jeep on the group in motion requires the fused efforts of a "jeep detection frame" sensor, a "motion detection frame" sensor, a "time of observation sensor" (i.e., so as to reacquire a vehicle that say passes under a bridge), a "thermal imaging sensor" so as to help assess if the jeep has been driven for some time or is just starting, et al.

Next, it might be necessary to know that the jeep has been powered for at least 5 minutes as an example of a simple mission. In the event that the system does not successfully accomplish this mission, all salient sensor states are gathered and recorded as a group. Ideally, this process will be under algorithmic control. Here, it is relatively easy for the programmer to say what sensor variables are salient, but very difficult to say what specific combination of these variables is salient. Indeed, that is why expert systems based approaches are doomed to fail. A proper sequence of actions can be specified by the user in the grammatical interface (see above), or by way of specification using any other intelligent system. Given this full case—including proper associated action(s), CBG will autonomously generalize and find analogs for the case and expunge the case as the former become verified over time (as previously described). All generalizations are automatically segmented and any released resources are reclaimed for reuse.

A key aspect of CBG is its capability for non monotonic reasoning. Here, one subsystem extracts information for presentation to another, which can iterate over many such subsystems. The global blackboard mechanism here communicates such iterative changes by way of a dynamic context. Likewise, mission priorities are communicated by way of the context and are themselves subject to change by way of the blackboard mechanism. But, the idea underpinning CBR and CBG is that the user (or system user) need only specify desired end actions and the system will autonomously arrange for the internal states to achieve it in such a way as to not unlearn previous training For example, suppose some combination of sensor readings is desired to produce some sequence of actions. Over time, that very combination will first produce intermediate action sequences in several subsystems. Many of those action sequences will post trigger variables (e.g., coordinates of potential terrorists) to the global system blackboard to expand or at least update the context, which is broadcast to the subsystems, cycles eliminated as previously discussed, and the iterations that ensue will otherwise end whenever a report action command is issued by one or more subsystems.

Notice that the response produced by each subsystem is a function of previous learning (i.e., when a new case was assigned to one or more segments) as is the iterative fusion of subsystem actions. Thus, and this is critical to simplistic training, only the correct response for the report action command is needed. The response provided by each subsystem is a result of previous training and thus is assumed to be correct. Even if not, it is corrected by subsequent fusion. Perhaps that is why we are always quicker to think using our native language than any secondarily acquired natural language.

The system thus will be reticent to lose previously acquired knowledge. However, we don't necessarily want it to attempt to fuse subsystem knowledge that is literally correct to arrive at the same action sequence. This cannot and need not be completely avoided, but it can be constrained through the proper use of the system squelch. For example, if any subsystem reports a contextual match at say the 99 percent possibility level or higher, then we would squelch out the responses of all "lesser-reporting" subsystems and report the action sequence produced by the current action sequence. Of course, this squelch would allow the iterative fusion of two or more subsystems reporting at the 99 percent possibility level or higher. Furthermore, each subsystem can operate using a distinct squelch and these squelches may be under local dynamic control, where they are set by action sequences—presumably under the control of evolutionary programming. The evolutionary step occurs to set the squelch so as to minimize the loss of pre-existing knowledge.

In this manner, model-based reasoning is achieved from the bottom up as opposed to the traditional top-down method using modeling languages. The advantage here is observed with scale; namely, validating complex models through inductive learning over time as opposed to design and debug approaches, which are appropriate for smaller-scale approaches. Two dynamic definition tables are created—one for situations and one for actions. Each table is local to a segment/processor though global definitions will be assumed here for the sake of simplicity. The content of each table is globally updated, but logical movement in each table need only be locally updated. Thus:

Situations (Set Ordering not Critical):
COMINT: communications intelligence
ELINT: electronic intelligence
Encrypted: secret communications
Carrier: aircraft carrier
N/A: Not Applicable
Fleet: a group of ships presumably on the same side
Tanker: hydrocarbon transport ship
Ship: a floating craft that moves on the water's surface
Hostile: a likely enemy
Neutral: neither friend nor enemy
Friendly: a likely ally
Danger: hazardous|perilous
Normal: neither dangerous nor suspicious
Suspicious: to be further investigated
Bad: malicious|wrong intentions
Good: an ally|proper intentions
Average: in between bad and good or poor and rich
Poor: without economic means
Rich: with an overabundance of economic means
Actions (Sequence Ordering Critical):
Peaceful: absence of uprising|no conflict
Surveillance: signal intelligence|visual review
Evasive: avoiding being observed or captured
War: a major conflict|a military combat
Note the selection of "a military combat" would cause War to be logically reorganized as follows at the head. The reorganization of situations may affect reductions.
War: a military combat|a major conflict
To continue this illustrative example, Table 4 presents exemplary data, which will be subject to directed mining using CBG.

TABLE 4

| Case | SIGINT | Imagery | HUMINT | MASINT | GEOINT | Logistical | Political | Economic | Activity |
|---|---|---|---|---|---|---|---|---|---|
| 1 | COMINT | Carrier | N/A | Hostile | Carrier | Danger | Bad | Poor | Peaceful |
| 2 | ELINT | Carrier | Ship | Neutral | Carrier | Normal | Good | Average | Surveillance |
| 3 | encrypted | N/A | Destroyer | Hostile | Carrier | Suspicious | Average | Poor | Evasive |
| 4 | COMINT | Fleet | Fleet | Neutral | Fleet | Normal | Good | Average | War |
| 5 | COMINT | Tanker | Tanker | Friendly | Tanker | Suspicious | Average | Rich | Surveillance |
| 6 | ELINT | Carrier | Carrier | Friendly | Carrier | Normal | Good | Rich | Peaceful |
| 7 | encrypted | Carrier | N/A | Hostile | Carrier | Suspicious | Good | Poor | War |
| 8 | COMINT | Tanker | Tanker | Friendly | Tanker | Normal | Good | Rich | Surveillance |
| 9 | COMINT | Tanker | Ship | Friendly | Tanker | Normal | Good | Rich | Surveillance |

The logical movement of situations and actions is handled in the same exact way. Again, both are moved to the logical head of their search list upon selection and this will speed up future access. Deletion is generally not allowed to prevent the occurrence of dangling pointers. Moreover, a given specification may have multiple extrapolations. Before allowing the user to select among them, the system searches separate dynamic caches for situations and actions for the extrapolation most-recently used. These caches are also updated at the head whenever an extrapolation is selected from within or without. Deletion occurs at the logical tail. The size of the stacks is determined empirically and may vary across processors. This principle of temporal locality has been proven in operating system designs. Next, the user might specify a case observation, such as:

C1: If the Logistical is neither dangerous nor suspicious and the Political is an ally and the Economic is in between bad and good or poor and rich, then the Activity is signal intelligence. Mission priorities are embedded in the context and are assumed to be implicit here for the sake of simplicity. The And/Or grammar provides reduction of specified and iteratively extrapolated natural language to:

C1': If the Logistical is Normal and the Political is Good and the Economic is Average, then the Activity is Surveillance.

Actually, C1' is a generalization of C2 in Table 4, which was abbreviated just to facilitate illustration. Suppose now that the LHS of C1' were the context in matching some case in Table 4. Here, the context $\subset S_2$, where $|S_i-\text{context}|$ was minimized (i.e., we minimized $|S_i-\text{context}|/|S_i|$, where the ratio is in the range (0, 1]). If Surveillance is the correct activity, then C1' is saved at the head of the logical case base. (If not, a different activity may be similarly associated and saved at the head of the case base.) Notice now that first any exact match of the LHS of C1' will properly produce the surveillance activity. Second, if the context $\subset S_1$, then again the surveillance activity will be produced, or another will be acquired using the "and/or" grammar. Finally, where the context $\supset S_1$, and this satisfies the definition of a closest match, an analogy is defined. While at this point, the defined analog has the same RHS, this need not be the case as a consequence of non monotonic reasoning, feedback, and segmented interaction(s), as follows.

To continue the example, let the analog S1', or context, be defined to be the HUMINT is a Fleet and the Political is Good and the Economic is Average. Here, the definition, context $\supset S_{1'}$ is satisfied and may be assumed to be a best match. The initial response will be Activity=Surveillance, but this may be corrected, using the "and/or" grammar, to "ACQUIRE" SIGINT, Imagery, MASINT, GEOINT, or any properly defined subset thereof. For the sake of simplicity, suppose we just acquire the GEOINT, which says that a Fleet is detected. This is a logical acquisition from a physical sensor. The updated context is now, HUMINT is a Fleet and GEOINT is a Fleet and the Political is Good and the Economic is Average. This context is then broadcast to each level found to be within threshold of having commonality with this situational context. Each segment within each such level is searched for a best match. Suppose that the best-found match is such that context $\supset S_{1'''}$. Here, suppose that $S_{1'''}$ is GEOINT is a Fleet and the Political is Good and the Economic is Average. The proper associated action is War, which is supplied by the user or equivalent system.

Notice that the user need only supply the final activity at each step and the system will autonomously record all intermediate activities. This makes the system user-friendly to employ. Thus, here whenever the system (i.e., barring further learning for this example) was to receive the context, S1', it would elicit a request for GEOINT, which say retrieved, "Fleet". This additional information would be posted to the global blackboard and after polling all levels and segments of levels within squelch would return the activity of War (or request a proper activity). The possibilities of error computed by equations (5) and (6), possibly including an aging mechanism, were not shown. This completes the illustration of how analog contexts can be associated with creative activities, which unlike the case for transformation converge to valid activities without the need for any transformational constant of proportionality.

Suppose that Case #4 in Table 4 had not (yet) been acquired. The creative analog rule, the acquisition of which was just illustrated, has successfully directed the mining of Table 4 beyond the initial data set. This means that the case base need not grow except in response to error correction and even then it will likely shrink in response to the formation of generalizations and analogs. This is in stark contrast to the way in which traditional directed mining works—i.e., by starting with a large table of data and iteratively reducing it to rule sets. Moreover, in traditional data mining there is an unsolved problem in over-fitting the data (i.e., finding rules that fail outside of the supplied data set). Here, the found rules first succeed outside of the supplied data set and are only confirmed by the supplied data set. This represents a fundamental improvement on how data mining can be done and more closely mimics the way in which the human brain operates.

Intermediate global blackboard postings, such as a request for GEOINT are really trigger variables as previously described. In general, they are abstract, but are brought about through requests for further domain-specific information (or positing domain-specific information) supplied by one or more segments for the purpose of iteratively augmenting the context until an action "lases" out. Actually, the laser provides a good analogy for knowledge amplification by structured expert randomization as implied here.

In the process of matching and firing multiple cases and their generalizations over multiple segments and posting intermediate results to the global blackboard, cycles may arise. They are broken by expunging the most recently fired case or generalization and continuing the iteration. This may induce memory loss at indeterminate points in other reasoning chains. This is necessary to keep the system acyclic and might explain why we humans need multiple exposures to training to reliably learn something. This is quite a different concept from the repetition required in training neural networks of all kinds and thus offers an alternative mechanism to explain knowledge acquisition in humans.

CBG allows for an exponential expansion in the capabilities of a case-based system to be realized over time. When coupled with grammatical inference employing temporal locality, it enables the rapid specification of complex situations and actions to be accomplished in a manner, which supports the effective reuse of concepts known to the computational system. Not only does this mitigate the need for learning multiple representations for knowledge, but also serves to improve the efficiency of the learning algorithm as well as the generality of the heuristic retrieval and replay mechanisms. It also allows for the ever-increasing compression of situational and action definitions (and thus case-based knowledge) held by the system at multiple levels. Finally, it can be used to bolster information security operations as well.

Methods have been specified for scaling CBG over virtually any number of processors to allow for rapid access to any number of (generalized) cases. The development of linked cases through the use of common shared variables enables each case to be as fine-grained as is practical. This in turn enables system creativity by way of facilitating action substitution at all points in the case replay of fine-grained knowledge. Unlike the case for parameter substitution, such replay does not have to be planned for in advance, but one or more CBG systems may be needed to refine the resulting output.

Heuristic search is employed to best match a context with a situation (across a distributed parallel network). Such a process may lead to generalization, where the original case is kept in memory until such time as the generalization (which may take the form of an analog due to the introduction of extraneous variables) is more or less validated through exercise and the use of possibility formulas (possibly including an aging mechanism).

The system includes technology for grammatical inference—including dynamic temporal records (i.e., a cache) of the same and again this enables it to rapidly complete the specification of conceptual situations and actions—both for use in problem solving and in training Different techniques, which are not mutually exclusive, were presented for minimizing the number of alternate definitions produced, and in so doing making for an easier-to-use system. The system is capable of massively parallel exercise as well as massively parallel learning across multiple trainers.

Finally, a hand-tailored example of CBG as applied to a problem in predicting COAs—including CBG-directed mining has pointed out the advantages the system holds over CBR; namely, a capability for autonomous generalization and analogy, ease of specification and reuse, and thus creativity in solving scalable problems. A laser-like capability for knowledge amplification emerges from the logical interaction among domain-specific segments via a global blackboard mechanism.

Unmanned autonomous vehicles (UAVs) represent another potential application area for the developed mechanics. UAVs today require approximately the same number of pilots to operate them as do manned vehicles. We want to enable a single human (i.e., not necessarily a pilot) to monitor and control say hundreds of vehicles. This is not likely to be practical unless data to decision support systems (D2D) are developed using CBG.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Further, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the disclosed embodiments include process steps and instructions described herein in the form of an algorithm. It should be noted that the process steps and instructions of the embodiments could be embodied in software, firmware or hardware, and when embodied in software, could be downloaded to reside on and be operated from different platforms used by a variety of operating systems. Different parts of the algorithm could be embodied in different elements of hardware or software, for example, as in a distributed system.

Referring now to FIG. 1, FIG. 1 shows a block diagram of one embodiment of a system 10 that may be used in accordance with the Case-Based Generalization Method. System 10 may include a first computing system 20 and a second computing system 60. System 10 is shown in a networked, multi-processor, distributed computing configuration. It should be recognized that system 10 may include substantially more networked computing systems 20 and 60 than those shown in FIG. 1. Additional computing systems allow for increased learning as system 10 scales upward.

Computing systems 20 and 60 may be substantially similar, and may be configured with the appropriate software modules to perform methods as discussed herein. The term "module" generally refers to a software module. A module may be implemented as a collection of routines and data structures that performs particular tasks or implements a particular abstract data type. Modules generally are composed of two parts. First, a software module may list the constants, data types, variables, and routines that may be accessed by other modules or routines. Second, a module may be configured as an implementation, which may be private (i.e., accessible only to the module), and which contains the source code that actually implements the routines or subroutines upon which the module is based. Thus, the use of the term "module" herein, indicates reference to such software modules or implementations thereof. The terms "module" and "software module" can be utilized interchangeably with one another to describe the same element or feature.

The Case-Based Generalization Method described herein may be implemented as a series of modules, either functioning alone or in concert with physical electronic and computer hardware devices. Such modules may be utilized separately and/or together locally and/or remotely to form a program product thereof, that may be implemented through signal-bearing media, including transmission media and recordable media. The methods described herein may be implemented as a program product comprised of a plurality of such modules, which can be interactively displayed for a user on a display screen of a data-processing system (e.g., computer). Such interactivity may be provided by a specialized graphical user interface (not shown).

System 20 may include a case base system 30 including a plurality of cases having one or more antecedents 40 and one or more associated consequents 42. System 30 may further include an optional word base 50. The cases and word base 50 may be stored in memory within computing system 20. Similarly, system 60 may include a case base system 70 including a plurality of cases having one or more antecedents 80 and one or more associated consequents 82. System 70 may further include an optional word base 90. The cases and word base 90 may be stored in memory within computing system 70.

In operation, user-supplied contexts are input into case base systems 20 and/or 60. The user-supplied contexts may comprise one or more contextual antecedents, such as contextual antecedents 92 and 94, which are compared to the one or more case antecedents, such as 40 or 80, that are stored in the case base. The contextual antecedents may be stored as integers in the case base system, using the word base to aid in the word-to-integer conversion. This conversion is done to save space and increase the efficiency of the various pattern matchers.

The cases stored in the case base include case antecedents and case consequents, both of which are previously supplied by a user, either during training of the system or during real-time system operation. A case involving the best match of the case antecedents with the contextual antecedents is then chosen. The consequent of the selected case is then displayed to a user, and, if the displayed consequent is not a question, the selected case is moved to the head of the case base, as indicated in FIG. 1. In the event memory constraints occur, least-frequently-used cases are deleted from the tail of the case base, as indicated (or moved to a backup secondary memory device such as an optical jukebox). In some embodiments, in a training mode, the system may display, in addition to the case consequent(s) an explanation of the case antecedent(s) that were matched with the contextual antecedent(s) supplied by the user.

Some general rules that may be implemented into the system and method disclosed herein may include: 1) cases may be learned if the user agrees with the consequent or not—so long as they do not duplicate an existing case, in which case the existing case is simply moved to the head of the queue; 2) cases are moved to the head of the queue so that the most-recently referenced case will break any ties among cases having the same computed possibility and so that the least-recently referenced cases will fall to the tail where they may be expunged with minimal functional loss; 3) consequents that ask a question however are not moved to the head because they are not as valuable as regular cases when (if) case memory fills up; and 4) consequents may be specified as "unknown" for consideration for subsequent specification (or not), when they may become known.

Figure 2:
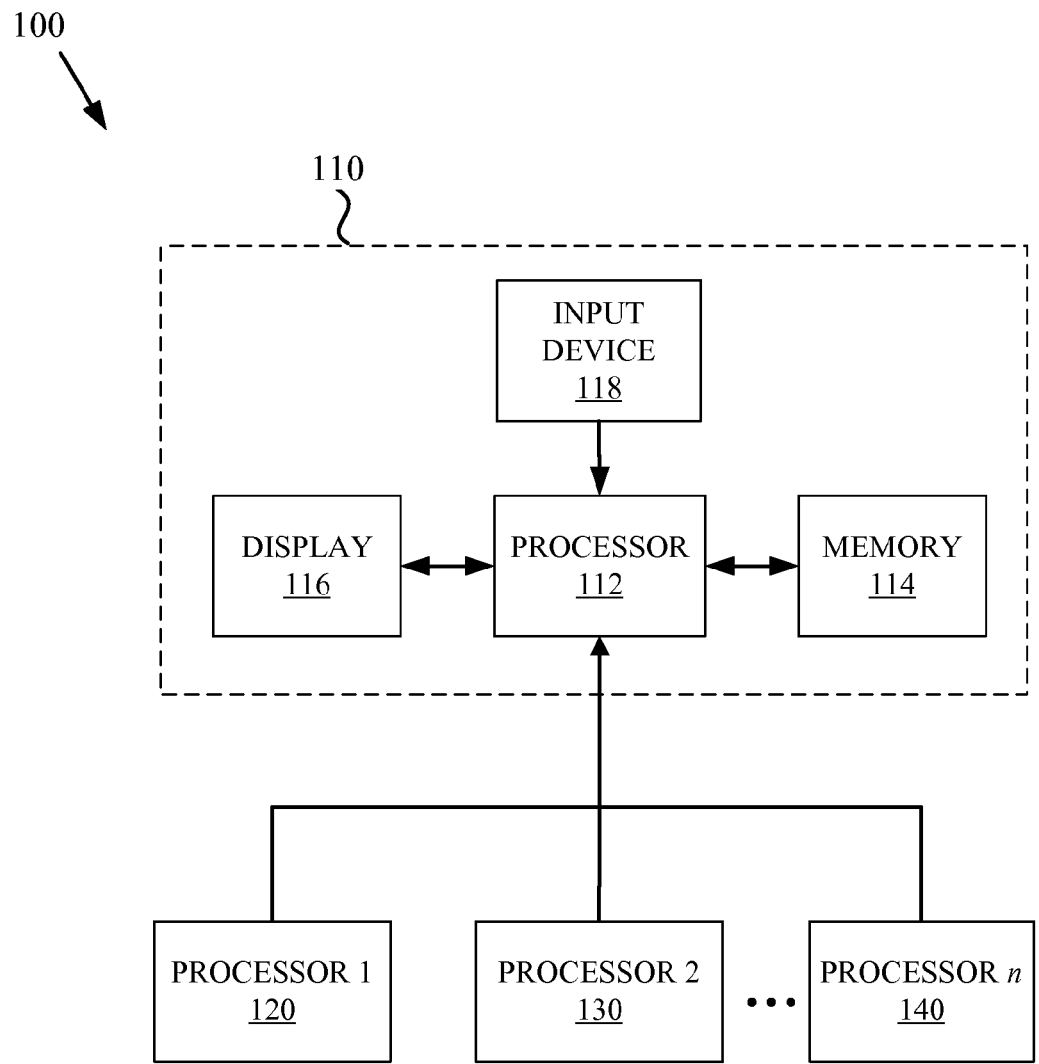
FIG. 2 shows a block diagram of an embodiment of a distributed processor system in accordance with the Case-Based Reasoning System Using Case Generalization Method.

FIG. 2 shows a block diagram of an embodiment of a distributed processor system 100 in accordance with the Case-Based Generalization Method. The speed of a case-based reasoning system can be increased through the use of associative memory and/or parallel (distributed) processors, such as shown in FIG. 2. Furthermore, an increase in speed can be obtained if information stores are subdivided for the case knowledge by domain for threaded parallel processing. This is known as segmenting the domain. Such segmentation can be automatically managed by inferred symbolic heuristics, but this will necessarily introduce much redundancy into the system—albeit brain-like. The idea here is to match the candidate case to be acquired against the dynamic case residing at the head of each segment. This case is acquired by those segments, whose head most-closely (not perfectly) matches it based on their possibilities.

Moreover, it is acquired by all segments whose current head is within δ of this new case, where δ is dynamically defined by the minimal possibility differential among case-base heads. However, whenever the computed possibility between the new case and the case-base heads is greater than the current maximum among case-base heads, δ, so that the new case falls outside of existing segments, the case is acquired by creating a new segment (i.e., given sufficient parallel nodes/space)—otherwise, the least-recently—used (LRU) segment is expunged and replaced. Thus, a system, such as system 10 or 100, may be cold-started with a pair of non-redundant segments.

Further, given a system such as system 100, it is possible for one or more computers to chat back and forth with each other if the output of each can serve to augment the input for another. This process is also brain-like because here the cases will acquire knowledge on how to solve a problem (e.g., by way of asking questions)—not just domain-specific knowledge. This respects the mathematical process of randomization. Every consequent (or response to a consequent) may be either terminal or non-monotonic in its action—as determined by whether or not it elicits additional knowledge from the user (or other subsystem) to augment the on-going context. The consequent(s) produced by this iterative feedback process may be corrected, as necessary. This is knowledge amplification because knowledge begets knowledge. That is, knowledge imbued along one path of reasoning becomes subsumed along other paths of reasoning.

Feedback plays an important role in the operation of this methodology. Feedback takes two forms: 1) consequents may raise questions, the answers to which, supplied by the users, server to augment the context, and 2) the consequents themselves may literally augment the context—again, under user control. The fact that antecedents and consequents can share the same space implies that words for both share the same words table.

Classical set theory does not allow for duplication of elements in the context or antecedent. However, sentential forms are sequence sensitive and thus differ from sets. For example, if I state, "location", you might think of a map; but, if I state, "location, location, location", you might instead think of real estate. Our system must be capable of making use of such sequence in matters of practical feedback. However, contextual duplicate words may not be counted because to do so would proportionately decrease the resultant possibility and thus result in a bad case match. Fortunately, not counting duplicates does not change the complexity of the algorithm. The context length is decreased by one for each such duplicate (i.e., when in default mode). Then, notice that traditionally deleterious cycles (e.g., a→a; a→b, b→a; etc.) become an asset because with the aforementioned feedback comes duplication in the context, which as we've witnessed can beneficially alter sentential semantics. This means that there is no need to hash to detect cycles (using stacked contexts) because such cycles are beneficial. Finally, the allowance for cycles implies that there is no need to copy the context into a buffer to facilitate data entry. Besides, it really won't make it any easier to enter data.

As such, system 100 may include a computer 110 having processors 120, 130, and 140 connected thereto. Computer 110 may include a processor 112, memory 114, display 116, and input device 118, such as a keyboard or mouse. System 100 may be used to provide an increase in computing capacity by allowing processor 112 to coordinate processors 120, 130, and 140 such that maximum processing capabilities are achieved.

Figure 3:
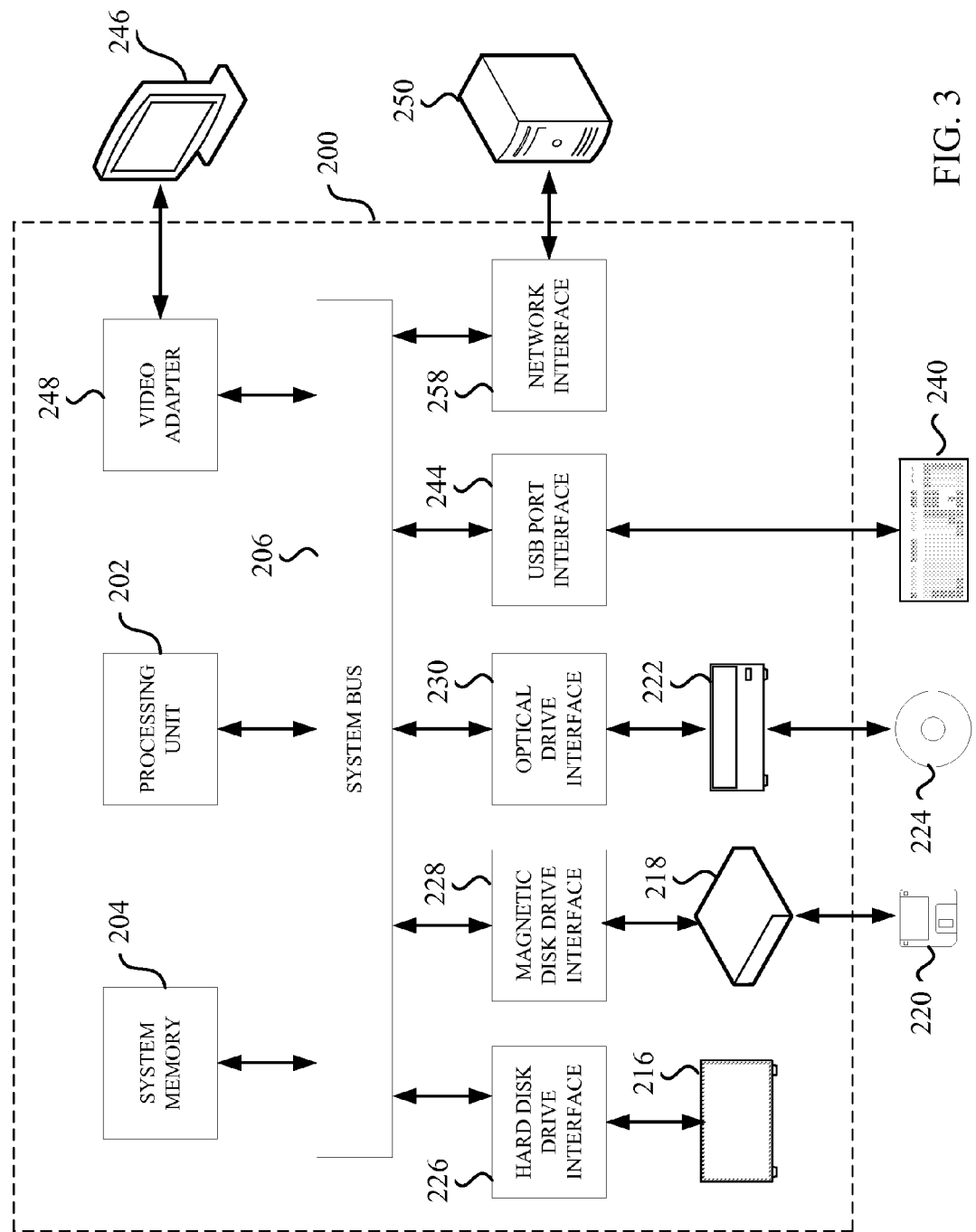
FIG. 3 shows a block diagram of an embodiment of a computing system for implementing and performing a method in accordance with the Case-Based Reasoning System Using Case Generalization Method.

FIG. 3 shows a block diagram of an embodiment of a computing system that may be used to implement a method in accordance with the Case-Based Generalization Method. FIG. 3 and the following description are intended to provide a brief, general description of a suitable computing environment in which an embodiment of the method discussed herein may be implemented. Although not required, the method will be described in the general context of computer-executable instructions, such as program modules, being executed by a personal computer.

Moreover, those skilled in the art will appreciate that embodiments of the method may be practiced with other computer system configurations, including hand-held devices, multiprocessor systems, microprocessor-based or programmable consumer electronics, networked personal computers, minicomputers, mainframe computers, and the like. Embodiments of the method may also be practiced in distributed computing environments where tasks are performed by remote processing devices that are linked through a communications network (such as shown in FIG. 2). In a distributed computing environment, program modules may be located on both local and remote memory storage devices.

System 200 may include a general-purpose computing device in the form of a conventional personal computer 200, which includes processing unit 202, system memory 204, and system bus 206 that operatively couple various system components to other system components (e.g., system bus 206 operatively couples system memory 204 to processing unit 202). Examples of system bus 206 include a memory bus, memory bus controller, peripheral bus and local bus using any of a variety of known bus structures. System memory 204 may include read only memory, random access memory, and a basic input/output system.

System 200 further includes hard disk drive 216 for reading from and writing to a hard disk (not shown) a magnetic disk drive 218 for reading from or writing to a removable magnetic disk 220 (e.g., 4.5-inch disk), and an optical disk drive 222 for reading from and writing to a removable optical disk 224 (e.g., CD-ROM and DVD). Hard disk drive 216, magnetic disk drive 218 and optical disk drive 222 are operatively connected to system bus 206 via hard disk drive interface 226, magnetic disk drive interface 228 and optical drive interface 230, respectively. The drives and their associated computer-readable media provide non-volatile storage of computer readable instructions, information structures, program modules and other information for personal computer 200.

The method steps of embodiments may be stored on a hard disk, magnetic disk 220, and optical disk 224. Although the exemplary environment described herein employs a hard disk, magnetic disk 220 and optical disk 224, it should be appreciated by those skilled in the art that other types of computer readable media that may store information accessible by a computer, (e.g., magnetic cassettes, flash memory cards, digital video disks, Bernoulli cartridges, random access memories (RAMs), and read only memories (ROMs)) may also be used in the exemplary operating environment without departing from the scope or spirit of embodiments of the method.

A user may enter commands and information into personal computer 200 via input devices such as keyboard 240 and pointing devices (e.g., mouse and trackball) (not shown in FIG. 3). Examples of input devices include a microphone, joystick, game pad, and satellite dish. Input devices may be operatively connected to processing unit 202 via universal serial bus (USB) port interface 244 that is operatively connected to system bus 206. Input devices may also be operatively connected to processing unit 202 via other interfaces (e.g., parallel port, serial port and game port) that are operatively connected to system bus 206. Monitor 246 is operatively connected to system bus 206 via video adapter 248.

Other peripheral devices (e.g., speakers and printers) may be operatively connected to system 200 via other interfaces. System 200 may operate in a networked environment using logical connections to one or more remote computers such as remote computer 250 via network a network, such as a local area network, wide area network, and wireless network. Examples of remote computer 250 include a personal computer, server, router, networked personal computer, peer device, and network node.

Figure 4A:
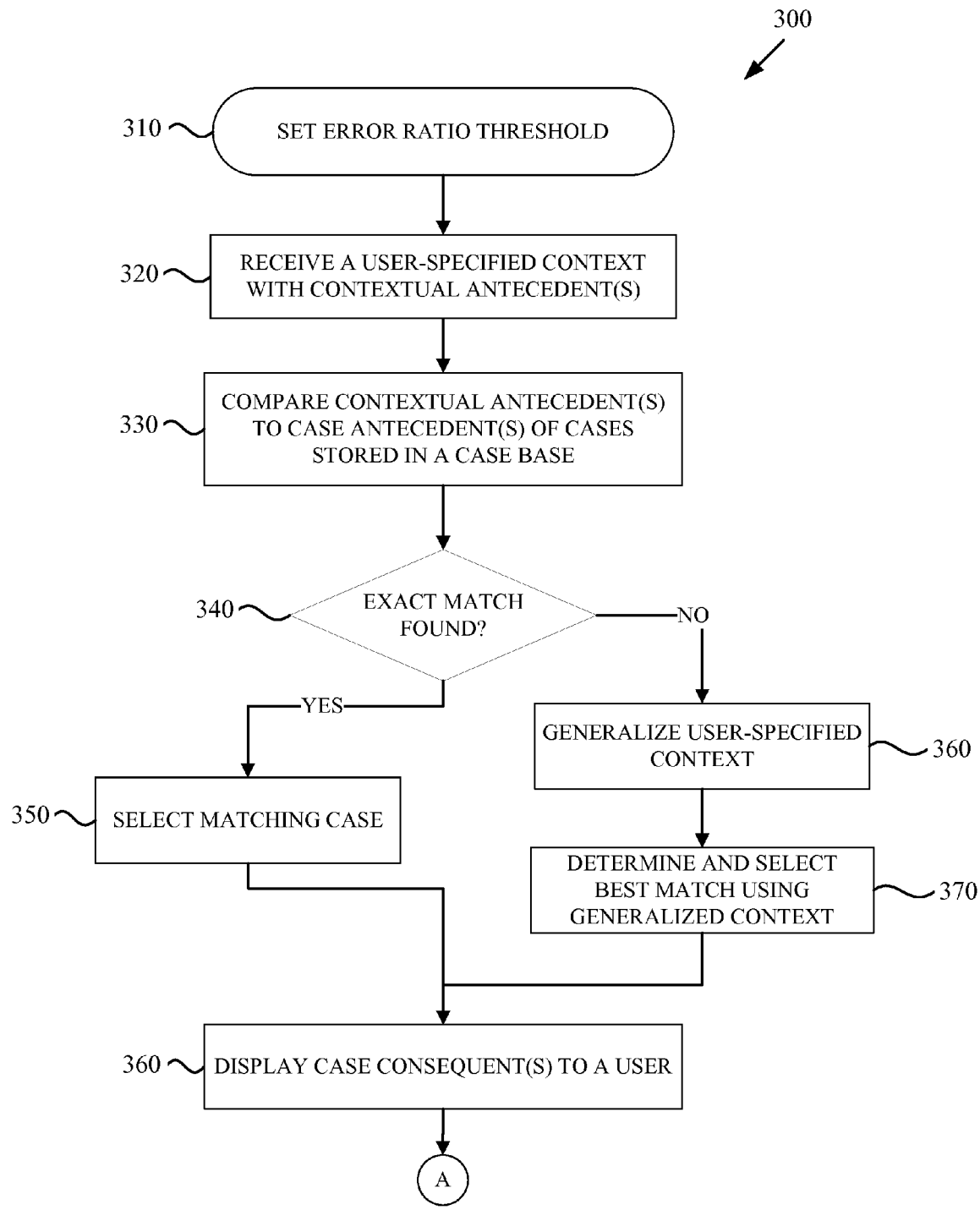
FIGS. 4A-4B show flowcharts of an embodiment of a method in accordance with the Case-Based Reasoning System Using Case Generalization Method.
Figure 4B:
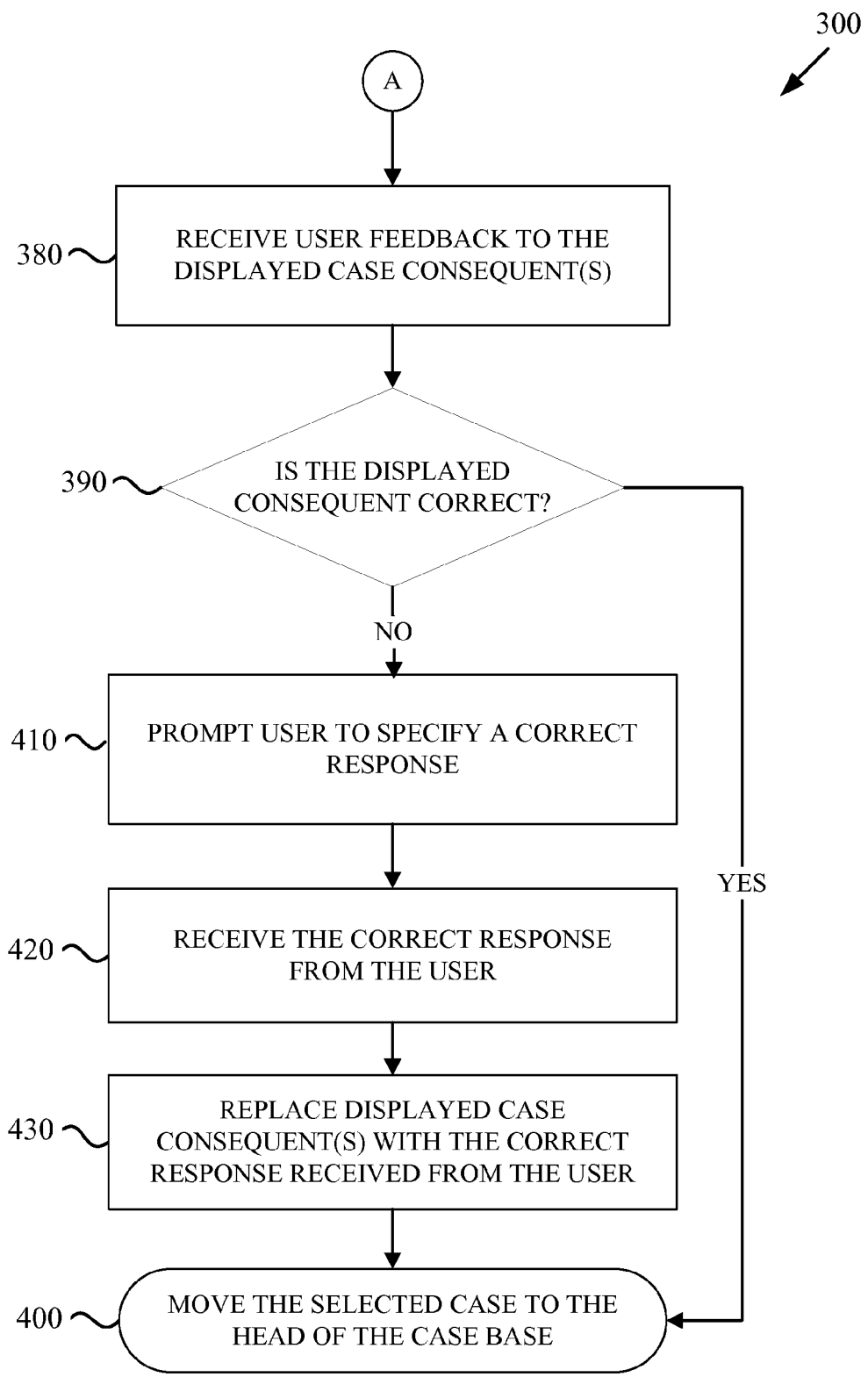

FIGS. 4A-4B show flowcharts of an embodiment of a method 300 in accordance with the Case-Based Generalization Method. Some or all of the steps of method 300 may be performed by a computer having a processing device connected thereto, such as computer 200 shown in FIG. 3 or system 100 shown in FIG. 2.

Referring to FIG. 4, method 300 may begin at step 310, which involves setting an error ratio threshold. As an example, this error ratio may be a defined percentage threshold of unity such that it is greater than zero (e.g. 50%). The greater the error ratio threshold, the less tolerance for error. A user of the system may set the error ratio threshold. Step 320 may then involve receiving a user-specified context having one or more natural language contextual antecedents. The natural language contextual antecedents may comprise words, numbers, or any combination thereof. The contextual antecedents may be single words, phrases, sentences, or multiple phrases or sentences. Further, the natural language contextual antecedents may be in any language identifiable by a user, such as English or Spanish. As an example, the user-specified context may be input by a user from a computer input device, such as keyboard 240.

In some embodiments of method 300, prior to step 320, a user may type in a context and may then be prompted by the system to specify a consequent. A user may desire to specify a consequent if the user wants to train the system to respond in a certain way to the user-specified context. If the user does not want to specify a consequent, the user may input that a search of the case base is desired, wherein the system may proceed with step 320 to receive the context and perform the steps as discussed below.

Step 330 may then involve comparing a user-specified context to a plurality of cases stored in a case base. Each case in the case base may include one or more case antecedents and one or more case consequents. As an example, in some embodiments the case antecedents and case consequents may be stored in the case base as sequences of integers representing the respective case antecedents and case consequents.

Step 340 may then involve determining if a matching case exists in the case base. A matching case is a case having case antecedents that exactly match the contextual antecedents. If a match exists, step 350 involves selecting the matching case. Then, step 360 involves displaying the case consequent of the selected exact matching case to a user. If, at step 340, an exact match is not found, method 300 proceeds to step 360. Step 360 involves generalizing the user-specified context to obtain proper covering. The generalization step may be performed as discussed above in the section entitled "Case-Based Generalization".

Step 370 then involves determining and selecting a best matching case. The best matching case is determined by comparing the generalized user-specified context to the cases stored in the case base. The best matching case is the case having the highest ratio of matching case antecedents to generalized contextual antecedents and having a matching error ratio that does not exceed the error ratio threshold. If multiple best-matching cases are determined, the selected best-matching case is the most-recently-used case of the multiple best-matching cases. In some embodiments where a best matching case is selected, step 360 further includes displaying an indication to the user that a generalization was required to make a case match.

After step 370, method 300 may proceed to step 360 to display the case consequents of the selected best matching case to the user. Following step 360, step 380 may involve receiving feedback from a user regarding the displayed case consequents. Step 390 may then involve a determination by the user as to whether the displayed case consequents are correct. If the user feedback indicates that the displayed case consequents are correct, the case associated with the displayed case consequents is moved to the head of the case base at step 400. However, if the user feedback indicates that the displayed case consequents are incorrect, in some embodiments of method 300 the case associated with the displayed case consequents is expunged from the case base.

In other embodiments, method 300 may proceed to step 410, which involves prompting the user to specify a correct response. In some embodiments of method 300, step 410 involves prompting a user to specify either a correct response or that the response is "unknown." If the user inputs that the response is "unknown," the system may, prior to step 310, prompt the user to provide correct responses to the cases having consequents identified as being "unknown." In such event, the system may prompt the user to identify responses for the cases involving the most-recently designated "unknown" consequents. The user may have the option not to provide a response, and may have the option to delete the cases involving unknown consequents.

Method 300 may then proceed to step 420, which involves receiving a correct response from the user. Next, step 430 involves replacing the displayed consequent of the selected case with the correct response from the user. Method 300 may then proceed to step 400, which involves moving the selected case to the head of the case base.

Some or all of the steps of method 300 may be stored on a computer readable storage medium, wherein the steps are represented by computer readable programming code. The steps of method 300 may also be computer-implemented using a programmable device, such as a computer-based system. Method 300 may comprise instructions that, when loaded into a computer-based system, cause the system to execute the steps of method 300. Method 300 may be implemented using various programming languages, such as "Java", "C", or "C++".

Various storage media, such as magnetic computer disks, optical disks, and electronic memories, as well as computer readable media and computer program products, can be prepared that can contain information that can direct a device, such as a micro-controller, to implement the above-described systems and/or methods. Once an appropriate device has access to the information and programs contained on the storage media, the storage media can provide the information and programs to the device, enabling the device to perform the above-described systems and/or methods.

For example, if a computer disk containing appropriate materials, such as a source file, an object file, or an executable file, were provided to a computer, the computer could receive the information, appropriately configure itself, and perform the functions of the various systems and methods outlined in the diagrams and flowcharts above to implement the various functions. That is, the computer could receive various portions of information from the disk relating to different elements of the above-described systems and/or methods, implement the individual systems and/or methods, and coordinate the functions of the individual systems and/or methods.

The language used in the specification has been principally selected for readability and instructional purposes, and may not have been selected to delineate or circumscribe the inventive subject matter. Accordingly, the disclosure of the inventive subject matter is intended to be illustrative, but not limiting, of the scope of the invention, which is set forth in the following claims.

Further, many modifications and variations of the Case-Based Reasoning System Using Case Generalization Method are possible in light of the above description. Within the scope of the appended claims, the Case-Based Reasoning System Using Case Generalization Method may be practiced otherwise than as specifically described. Further, the scope of the claims is not limited to the implementations and embodiments disclosed herein, but extends to other implementations and embodiments as contemplated by those having ordinary skill in the art.

I claim:

1. A computer-implemented method comprising the steps of:

setting an error ratio threshold;

comparing a user-specified context comprising one or more natural language contextual antecedents to a plurality of cases stored in a case base, each case stored in the case base comprising one or more case antecedents and one or more case consequents;

determining if a matching case exists in the case base, wherein the matching case is the case having case antecedents that exactly match the contextual antecedents;

selecting the matching case if it exists, else selecting a best matching case, wherein the step of selecting a best matching case includes generalizing the case antecedents of the cases stored in the case base and comparing the user-specified context to the cases stored in the case base having generalized antecedents to determine the best-matching case, wherein the generalization of the case antecedents involves minimizing $|S_i-\text{context}|/|S_i|$, where $S_i$ is a situational variable representing a case antecedent and the context is the contextual antecedents, wherein the best matching case is the case having the highest ratio of matching case antecedents to contextual antecedents and having a matching error ratio that does not exceed the error ratio threshold; and displaying the case consequents of the selected case to a user.

2. The computer-implemented method of claim 1, wherein if multiple best-matching cases are determined, the selected best-matching case is the most-recently-used case of the multiple best-matching cases.

3. The computer-implemented method of claim 1 further comprising the step of receiving feedback from a user regarding the displayed case consequents.

4. The computer-implemented method of claim 3, wherein if the user feedback indicates that the displayed case consequents are incorrect, the case associated with the displayed case consequents is expunged from the case base.

5. The computer-implemented method of claim 3, wherein if the user feedback indicates that the displayed case consequents are correct, case associated with the displayed case consequents is moved to the head of the case base.

6. The computer-implemented method of claim 1, wherein if a best matching case is selected, the method further comprises the step of displaying an indication to the user that a generalization was required to make a case match.

7. A non-transitory computer-readable storage medium having a method stored thereon, the method represented by computer-readable programming code, the method comprising the steps of:

setting an error ratio threshold;

comparing a user-specified context comprising one or more natural language contextual antecedents to a plurality of cases stored in a case base, each case stored in the case base comprising one or more case antecedents and one or more case consequents;

determining if a matching case exists in the case base, wherein the matching case is the case having case antecedents that exactly match the contextual antecedents;

selecting the matching case if it exists, else selecting a best matching case, wherein the step of selecting a best matching case includes generalizing the case antecedents of the cases stored in the case base and comparing the user-specified context to the cases stored in the case base having generalized antecedents to determine the best-matching case, wherein the generalization of the case antecedents involves minimizing $|S_i-\text{context}|/|S_i|$, where $S_i$ is a situational variable representing a case antecedent and the context is the contextual antecedents, wherein the best matching case is the case having the highest ratio of matching case antecedents to contextual antecedents and having a matching error ratio that does not exceed the error ratio threshold; and displaying the case consequents of the selected case to a user.

8. The non-transitory computer-readable storage medium of claim 7, wherein if multiple best-matching cases are determined, the selected best-matching case is the most-recently-used case of the multiple best-matching cases.

9. The non-transitory computer-readable storage medium of claim 7 further comprising the step of receiving feedback from a user regarding the displayed case consequents.

10. The non-transitory computer-readable storage medium of claim 9, wherein if the user feedback indicates that the displayed case consequents are incorrect, the case associated with the displayed case consequents is expunged from the case base.

11. The non-transitory computer-readable storage medium of claim 9, wherein if the user feedback indicates that the displayed case consequents are correct, case associated with the displayed case consequents is moved to the head of the case base.

12. The non-transitory computer-readable storage medium of claim 7, wherein if a best matching case is selected, the method further comprises the step of displaying an indication to the user that a generalization was required to make a case match.

13. A system comprising:
- a computer having a computer input device and a display device connected thereto; and
- a plurality of distributed processors communicatively coupled to the computer wherein the computer is configured to coordinate the activities of the distributed processors, wherein each of the distributed processors is configured to maintain a case base, wherein each of the plurality of distributed processors are configured to perform a method including the steps of:

setting an error ratio threshold;

comparing a user-specified context comprising one or more natural language contextual antecedents to a plurality of cases stored in the case base, each case stored in the case base comprising one or more case antecedents and one or more case consequents;

determining if a matching case exists in the case base, wherein the matching case is the case having case antecedents that exactly match the contextual antecedents;

selecting the matching case if it exists, else selecting a best matching case, wherein the step of selecting a best matching case includes generalizing the case antecedents of the cases stored in the case base and comparing the user-specified context to the cases stored in the case base having generalized antecedents to determine the best-matching case, wherein the generalization of the case antecedents involves minimizing $|S_i-\text{context}|/|S_i|$, where $S_i$ is a situational variable representing a case antecedent and the context is the contextual antecedents, wherein the best matching case is the case having the highest ratio of matching case antecedents to contextual antecedents and having a matching error ratio that does not exceed the error ratio threshold;

displaying, via the display device, the case consequents of the selected case to a user; and receiving, via the computer input device, feedback from the user regarding the displayed case consequent.

14. The system of claim 13, wherein if the user feedback indicates that the displayed case consequents are incorrect, the case associated with the displayed case consequents is expunged from the case base.

15. The system of claim 13, wherein if the user feedback indicates that the displayed case consequents are correct, case associated with the displayed case consequents is moved to the head of the case base.

16. The system of claim 13, wherein if a best matching case is selected, the method further comprises the step of displaying, via the display device, an indication to the user that a generalization was required to make a case match.

* * * * *